United States Patent [19]

Ikemoto et al.

[11] 4,355,543
[45] Oct. 26, 1982

[54] DEVICE FOR SUPPORTING A SHIFT LEVER IN A MANUAL TRANSMISSION FOR AN AUTOMOBILE

[75] Inventors: Kazuhito Ikemoto; Nobuaki Katayama; Yukio Terakura, all of Toyota; Kan Sasaki, Aichi, all of Japan

[73] Assignee: Toyota Jidosha Kogyo Kabushiki Kaisha, Toyota, Japan

[21] Appl. No.: 215,702

[22] Filed: Dec. 12, 1980

[30] Foreign Application Priority Data

Aug. 20, 1980 [JP] Japan ............................ 55-118555

[51] Int. Cl.³ .................... G05G 9/18; F16C 11/08
[52] U.S. Cl. .................... 74/473 P; 403/133; 403/140
[58] Field of Search .............. 74/473 R, 473 P; 403/133, 135, 140

[56] References Cited

U.S. PATENT DOCUMENTS

| | | | |
|---|---|---|---|
| 3,108,830 | 10/1963 | Fierstine | 403/140 |
| 3,164,389 | 1/1965 | Thomas | 403/140 X |
| 3,422,697 | 1/1969 | Brown et al. | 74/473 |
| 3,482,465 | 12/1969 | Lusted | 74/473 P |
| 3,780,596 | 12/1973 | Takahashi et al. | 74/473 P |

FOREIGN PATENT DOCUMENTS 1215946 11/1959 France ............................ 74/473 P Primary Examiner—Allan D. Herrmann
Attorney, Agent, or Firm—Stevens, Davis, Miller & Mosher

[57] ABSTRACT

A device for supporting a shift lever in a manual transmission for an automobile which includes the shift lever having a large spherical portion and a small spherical portion, a shift lever retainer supporting the large spherical portion of the shift lever, a resin bush having a cylindrical outer surface spherically engaging with the small spherical portion of the shift lever and a shift lever housing fixed to an operation lever shaft extending toward the transmission. The device comprises a cylindrical vibration preventing bush interposed between the cylindrical outer surface of the resin bush and the inner surface of a hole in the shift lever housing. The vibration preventing bush consists of a metallic outer cylinder inserted under pressure into the inner surface of the hole in the shift lever housing, a cylindrical vibration absorbing member secured to the inner surface of the outer cylinder and a resin layer formed on the inner surface of the cylindrical vibration absorbing member for slidingly contacting the outer surface of the resin bush engaging with the small spherical portion of the shift lever.

6 Claims, 4 Drawing Figures

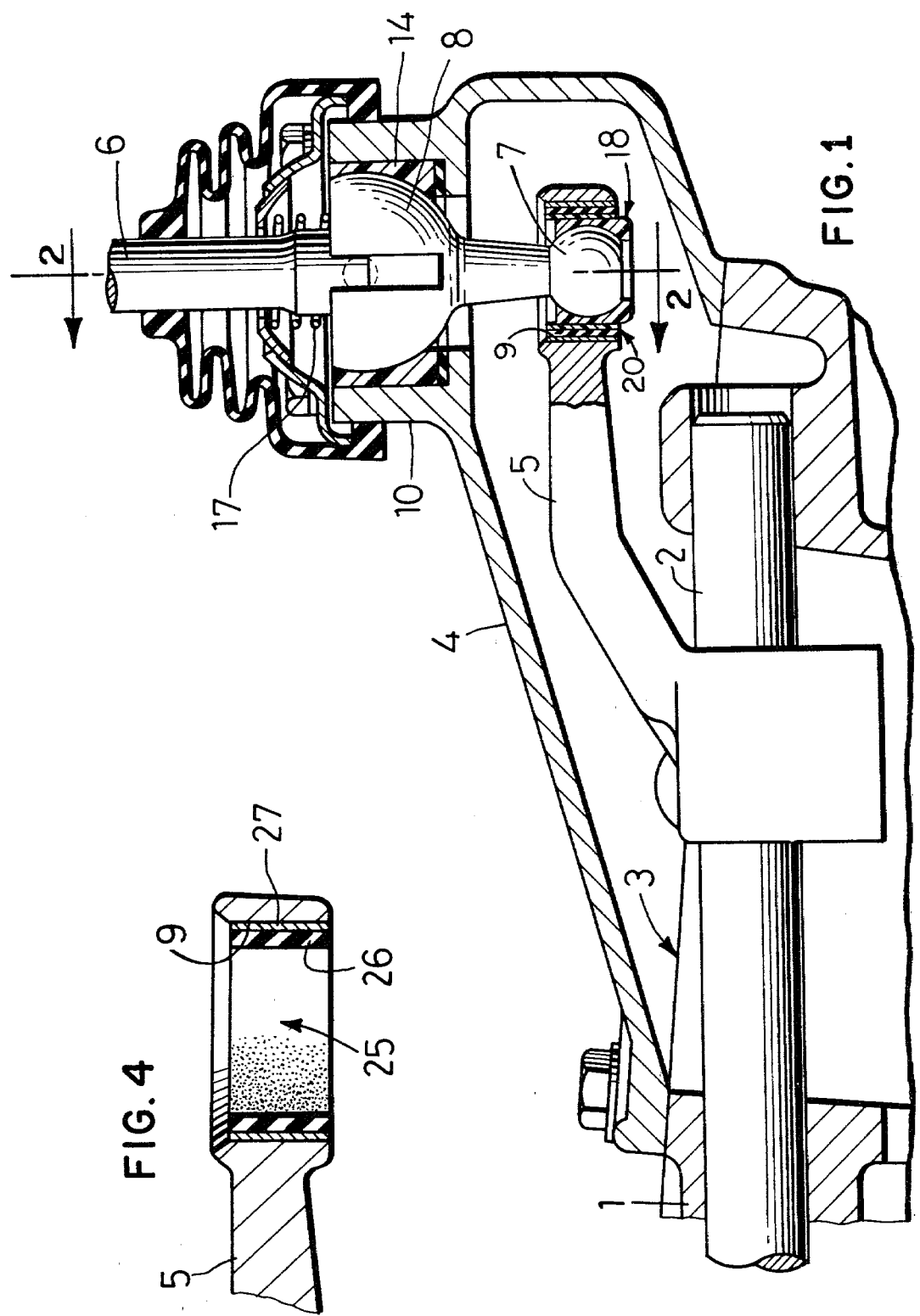

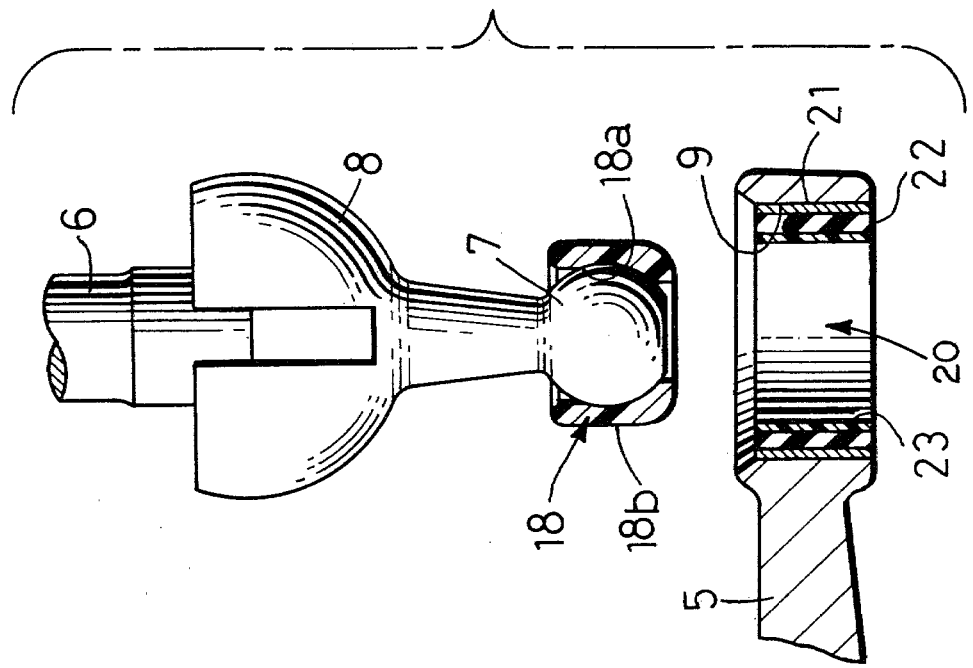
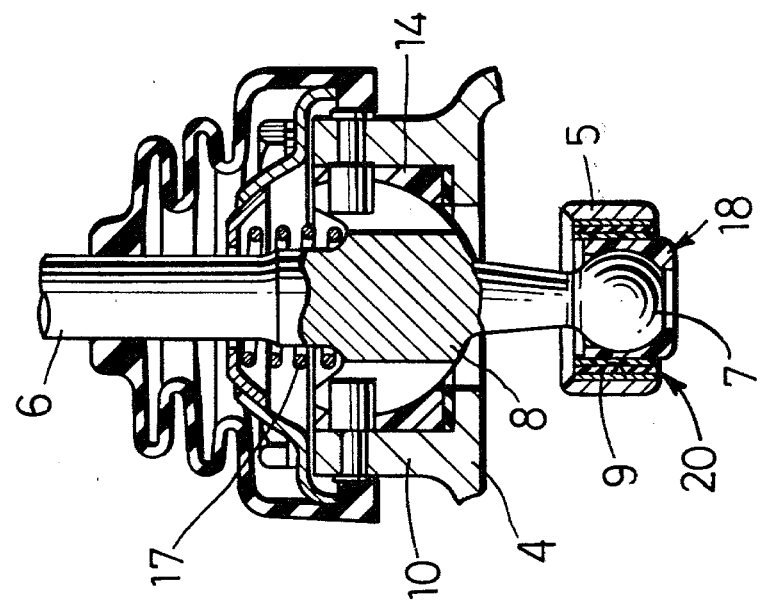

DEVICE FOR SUPPORTING A SHIFT LEVER IN A MANUAL TRANSMISSION FOR AN AUTOMOBILE

BACKGROUND OF THE INVENTION

1. Field of the Invention

The present invention relates to a device for supporting a floor type shift lever in a manual transmission for an automobile, and more particularly, it relates to a device for supporting a shift lever for a manual transmission in which a resin bush spherically engaged with a small spherical portion provided in the lower end of the shift lever is inserted into a hole formed in a shift lever housing fixed to an operation lever shaft to connect the lower end of the shift lever with the shift lever housing.

2. Description of the Prior Art

In a conventional device for supporting a shift lever of the aforementioned type, a vibration preventing bush made of resin is interposed between a small spherical portion provided in the lower end of a shift lever and a hole formed in a shift lever housing for preventing the shift lever from vertical vibration caused by vibration transmitted from power units of the automobile such as an engine, a clutch and a transmission, and from noise generated following the vertical vibration. Such a vibration preventing bush is preferably made of soft resin material for effectively damping the vibration. In this case, however, operation feeling is deteriorated upon shift-and-select operation of the shift lever for the reason of development of large resistance on rotational sliding, i.e., spherical sliding between the small spherical portion of the shift lever and the inner spherical surface of the bush and on vertical sliding between the bush and the shift lever housing since the soft resin material has high coefficient of friction. Consequently, the soft resin material having good vibration characteristics cannot be used when the operation feeling is taken into consideration, and the aforementioned vibration cannot be effectively prevented.

SUMMARY OF THE INVENTION

It is an object of the present invention to provide a device for supporting a shift lever in a manual transmission for an automobile which can effectively prevent vertical vibration of the shift lever and noise following the same.

It is another object of the present invention to provide a device for supporting a shift lever in a manual transmission for an automobile which can improve operation feeling.

According to the present invention, there is provided a device for supporting a shift lever in a manual transmission for an automobile in which a vibration preventing bush is interposed between a resin bush covering a small spherical portion of the shift lever and the inner surface of a hole formed in a shift lever housing into which the resin bush is inserted to effectively prevent the shift lever from vertical vibration and noise following the same, and further, the vibration preventing bush slidingly contact the resin bush covering the small spherical portion of the shift lever is provided in its inner periphery with a resin layer having low coefficient of friction so as to reduce frictional resistance between the bushes, keep operation feeling good and prevent abrasion of the bushes.

BRIEF EXPLANATION OF THE DRAWINGS

FIG. 1 is a vertical sectional view showing the structure for supporting the shift lever;

FIG. 2 is a sectional view taken along the line 2—2 of FIG. 1;

FIG. 3 is an exploded sectional view of the shift lever and a shift lever housing; and FIG. 4 is a cross sectional view of another shift lever housing.

DESCRIPTION OF THE PREFERRED EMBODIMENT

Referring now to FIG. 1 of the drawings in which structure for supporting a floor type shift lever for a manual transmission is shown in section, an extension housing 1 is provided in the rear side of a transmission housing (not shown) and contains an operation lever shaft 2 extending toward the manual transmission and is rotatable about its axis and movable in the axial direction. The housing 1 has an opening 3 in its upper surface, and a shift lever retainer 4 communicating with the interior of the housing 1 through the opening 3 is secured at its lower end to the periphery of the opening 3 by bolts. A socket 10 of the retainer 4 spherically supports through a seat 14 made of resin a large spherical portion 8 of a shift lever 6 which is capable of shift-and-select operation. The large spherical portion 8 is always pressed against the seat 14 by a coiled spring 17.

Within the shift lever retainer 4, there is provided a shift lever housing 5 which is secured at one end to the operation lever shaft 2. The shift lever housing 5 has a hole 9 in its other end to be engaged with a small spherical portion 7 provided in the lower end of the shift lever 6.

As shown in FIGS. 2 and 3, the small spherical portion 7 of the shift lever 6 is covered by a bushing 18 made of resin such as nylon. The resin bushing 18 has a spherical inner surface 18a for spherical engagement with the small spherical portion 7 and a cylindrical outer surface 18b (see FIG. 3). A vibration preventing bushing 20 is interposed between the cylindrical outer surface 18b of the resin bush 18 and the inner surface of the hole 9 of the shift lever housing (see FIGS. 1 and 2). As shown in FIG. 3, the vibration preventing bushing 20 has a metallic outer cylinder 21 which is inserted into the hole 9 of the shift lever housing 5 under pressure. A cylindrical vibration absorbing member 22 made of elastic material such as rubber is secured to the inner surface of the metallic outer cylinder 21 by a means such as seizure. The inner surface of the vibration absorbing member 22 is coated by a layer 23 made of resin such as Teflon having low coefficient of friction. When the shift lever 6 and the housing 5 are connected with each other, the outer surface 18b of the resin bushing 18 rotatably and slidably contacts the resin layer 23 of the vibration preventing bush 20.

Under the aforementioned condition, the shift-and-select operation of the shift lever 6 is transmitted from the small spherical portion 7 to the housing 5 through the bushings 18 and 20, and from the housing 5 to the operation lever shaft 2. When the shift lever 6 is operated, the resin bushing 18 covering the small spherical portion 7 vertically moves pressing the vibration preventing bushing 20. In this case, the vibration absorbing member 22 of the vibration preventing bushing 20 is prevented from partial elastic deformation by the resin layer 23, and further, the resin bushing 18 covering the small spherical portion 7 smoothly slides along the inner periphery of the vibration preventing bushing 20 since the resin layer 23 has low coefficient of friction.

Moreover, the vibration transmitted from the engine and the manual transmission through the operation lever shaft 2 and the housing 5 is effectively absorbed by the cylindrical vibration absorbing member 22 of the vibration preventing bushing 20 and the resin bushing 18. Consequently, the shift lever 6 is prevented from vertical vibration caused by vibration of the housing 5 and from noise generated following the vertical vibration.

FIG. 4 shows an enlarged partial cross sectional view of the shift lever housing 5 provided in its hole 9 with another vibration preventing bushing 25 which is formed by a rubber member 26 and a metallic outer cylinder 27. The function of the vibration preventing bushing 25 is substantially identical with that of the vibration preventing bushing 20.

While the invention has been described with reference to a preferred embodiment thereof, it is to be understood that modifications or variations may be easily made without departing from the scope of this invention which is defined by the appended claims.

What is claimed is:

1. In combination with a manual transmission for an automobile including a shift lever having a large spherical portion and a small spherical portion provided in the lower end thereof, a shift lever retainer supporting said large spherical portion of said shift lever for shift-and-select operation, a resin bushing having a cylindrical outer surface spherically engaging with said small spherical portion of said shift lever and a shift lever housing fixed to an operation lever shaft extending toward said transmission, said bushing being inserted into a hole formed in said shift lever housing for connecting said shift lever with said shift lever housing, a device for supporting said shift lever comprising a cylindrical vibration preventing bushing interposed between said cylindrical outer surface of said resin bushing and the inner surface of said hole in said shift lever housing, said cylindrical vibration preventing bushing comprising a metallic outer cylinder inserted under pressure into said inner surface of said hole in said shift lever housing, a cylindrical vibration absorbing member secured to the inner surface of said outer cylinder and a resin layer formed on the inner surface of said cylindrical vibration absorbing member for slidingly contacting said outer surface of said resin bushing engaging with said small spherical portion of said shift lever, said resin layer having a low coefficient of friction.

2. The invention as defined in claim 1 wherein said cylindrical vibration preventing bush is made of rubber.

3. The invention as defined in claim 1 wherein said vibration absorbing member is made of elastic material.

4. The invention as defined in claim 3 wherein said elastic material is rubber.

5. The invention as defined in claim 1 wherein said resin layer is formed by coating of resin.

6. The invention as defined in claim 5 wherein said coating of resin is Teflon.

* * * * *